United States Patent [19]
Rao et al.

[11] Patent Number: 5,691,087
[45] Date of Patent: *Nov. 25, 1997

[54] SEALED LEAD-ACID CELLS AND BATTERIES

[75] Inventors: Purushothama Rao, Aurora, Ill.;
Thomas F. Uhlemann, Edina, Minn.

[73] Assignee: GNB Technologies, Inc., Mendota Heights, Minn.

[*] Notice: The term of this patent shall not extend beyond the expiration date of Pat. No. 5,298,350.

[21] Appl. No.: 673,149

[22] Filed: Jul. 1, 1996

Related U.S. Application Data

[63] Continuation-in-part of Ser. No. 340,631, Nov. 16, 1994, abandoned, which is a continuation-in-part of Ser. No. 852,803, Mar. 17, 1992, Pat. No. 5,298,350, which is a continuation-in-part of Ser. No. 675,298, Mar. 26, 1991, abandoned.

[51] Int. Cl.[6] ................................................... H01M 4/68
[52] U.S. Cl. ............................................................. 429/245
[58] Field of Search ................................. 429/233, 226, 429/245

[56] References Cited

U.S. PATENT DOCUMENTS

| | | | |
|---|---|---|---|
| 4,092,462 | 5/1978 | Giess et al. | 429/245 X |
| 4,125,690 | 11/1978 | Bagshaw et al. | 429/226 |
| 4,358,518 | 11/1982 | Matter | 429/245 |
| 4,626,338 | 12/1986 | Guerriero et al. | 429/226 X |
| 5,298,350 | 3/1994 | Rao | 429/245 |

OTHER PUBLICATIONS

Sirard and Gerner, "Development of a VRLA Battery for High Temperature Applications," *IEEE*, pp. 637–643 (1995) (month unknown).

Gerner et al., "A High Temperature Test Program For VRLA Batteries," IEEE, pp. 327–333 (1996) (month unknown).

*Primary Examiner*—Stephen Kalafut
*Attorney, Agent, or Firm*—Leydig, Voit & Mayer, Ltd.

[57] ABSTRACT

A sealed lead-acid cell or battery includes positive plates made from an alloy consisting essentially of lead, from about 0.025% to about 0.06% calcium, from about 0.3% to about 0.9% tin, and from about 0.015% to about 0.045% silver.

4 Claims, 7 Drawing Sheets

SEALED LEAD-ACID CELLS AND BATTERIES

RELATED APPLICATION

Rao, Ser. No. 07/675,298, filed Mar. 26, 1991, for: Calcium-Tin-Silver Lead-Based Alloys, And Battery Grids And Lead-Acid Batteries Made Using Such Alloys (now abandoned), the present application being a continuation-in-part of Rao Ser. No. 08/340,631, filed Nov. 16, 1994 (now abandoned) which is, in turn a continuation-in-part of Ser. No. 07/852,803, filed Mar. 17, 1992, for: Calcium-Tin-Silver Lead-Based Alloys, And Battery Grids And Lead-Acid Batteries Made Using Such Alloys, now U.S. Pat. No. 5,298,350, which is, in turn, a continuation-in-part of Ser. No. 07/675,298, filed Mar. 26, 1991 (now abandoned).

This invention relates to lead-acid batteries and, more particularly, to grids and plates used in making such batteries and to the method of making such grids and plates.

BACKGROUND OF THE INVENTION

Over the last 15 to 20 years or so, there has been substantial interest in automotive-type, lead-acid batteries which require, once in service, little, or more desirably, no further maintenance throughout the expected life of the battery. This type of battery is usually termed a "low maintenance" or "maintenance-free battery". The terminology maintenance-free battery will be used herein to include low maintenance batteries as well. This type of battery was first commercially introduced in about 1972 and is currently in widespread use.

A considerable amount of attention over the years has been given to the type of alloys used for manufacturing positive and negative grids in such maintenance-free batteries. When maintenance-free batteries were first commercially introduced, the conventional automotive lead-acid battery normally used grids made from antimony-lead alloys in which the antimony content ranged from about 3–4.5% by weight of the alloy composition. Such alloys were capable of being commercially produced at acceptable rates into battery grids by the gravity casting production techniques then widely used. Moreover, the batteries made using grids of such alloy compositions had desirable deep discharge cycling characteristics.

However, such high antimony content lead-based alloys could not be used in grids in maintenance-free batteries. Thus, the use of such high antimony content alloys resulted in the batteries having undesirable higher gassing, higher self-discharge on stand, and higher attendant water loss characteristics. In other words, batteries with grids made from such alloys accepted high end of charge current during constant voltage overcharge so that excessive gas generation occurred. Accompanying this gas generation was loss of water from the battery electrolyte.

The assignee of the present invention and its predecessors in interest have been in the forefront of research relating to alloys and maintenance-free batteries. Among the patents relating to this subject are the following U.S. Pat. Nos.: 4,006,035; 4,007,056; 4,166,155 and 4,456,579.

Much commercial interest has centered around the use of calcium-tin-lead alloys for use in making grids for maintenance-free batteries. The calcium content in such alloys for positive grids has varied generally from about 0.06 to about 0.1% by weight of the alloy while the tin has generally ranged from about 0.1 up to 0.8% and even more. More typically, the calcium content in such alloys when used for making maintenance-free battery grids has been at least about 0.08% by weight or more.

Other commercial interest for maintenance-free battery grids has been directed to the use of "low antimony" lead-based alloys, viz., alloys containing antimony contents of about 1 to about 2.5%, more typically about 1.5% or so. Use of such low antimony alloys generally required the need to add other alloying ingredients since such low antimony alloys were not capable of being made into grids at acceptable rates under normal production conditions.

Other approaches for grid alloys in maintenance-free batteries have included the use of "hybrid" alloy systems. Most typically, a low antimony, lead-based alloy is used as the alloy for the positive grids while an antimony-free alloy is employed for the negative grids. Often, the alloy of choice for the negative grids has been a calcium-tin-lead alloy or a calcium-aluminum lead alloy.

It has been well recognized over the years that lead-acid batteries are perishable products. Eventually, such batteries in service will fail through one or more of several failure modes. Among these failure modes are failure due to positive grid corrosion and excessive water loss. The thrust of maintenance-free batteries has been to provide a battery that would forestall the failure during service for a period of time considered commensurate with the expected service life of the battery, e.g., three to five years or so.

To achieve this objective, the positive grids used initially for maintenance-free batteries typically had thicknesses of about 60 to about 70 mils or so. The batteries were likewise configured to provide an excess of the electrolyte over that needed to provide the rated capacity of the battery. In that fashion, by filling the electrolyte to a level above that of the top of the battery plates, maintenance-free batteries contained, in effect, a reservoir of electrolyte available to compensate for the water loss, during the service life of the battery. In other words, while the use of appropriate grid alloys will reduce water loss during the service life of the battery, there will always be some water loss in service.

Over the past several years, the manufacture of such automotive lead-acid batteries, typically termed SLI automotive batteries (principally used for the starting, lighting and ignition requirements of an automobile), has become substantially more complex. Battery grids have typically been made by gravity casting (e.g., the molten alloy is fed into what is termed a book mold and is then allowed to solidify, the book mold providing either one or two side-by-side grids). Production equipment using an alternate method to fabricate grids is now commercially available by which battery grids can be continuously formed by expanded metal fabrication techniques. For example, a rolled or wrought alloy strip or a cast strip is slit and expanded using reciprocating dies or the like and then cut into the desired width and height dimensions to form the grid with a lug.

Automobile battery manufacturers thus have available a variety of techniques for forming battery grids in production. However, the effect on performance of the batteries when such techniques are used is not understood all that well. This lack of understanding is particularly evident in view of the factors complicating current SLI battery performance requirements.

One complicating factor in attempting to provide satisfactory service life is the seemingly ever-increasing power and energy requirements demanded in current SLI automotive batteries used in modern automobiles. Many factors have contributed to the need and/or desire for such higher power and energy for such batteries. One major measure of power currently in common usage is the rated number of cold cranking amps. The number of cold cranking amps is considered in the industry as some indication of the relative power of the battery to start an automobile in cold temperature conditions.

Yet another complicating factor is the "under-the-hood" space requirements. Automobile manufacturers have significantly decreased the overall space available for batteries in the engine compartment. Typically, this has required that battery manufacturers provide a lower profile battery, viz., a battery having less overall height than previously required so as to meet current aerodynamic styling needs in automobiles. Such lower profile batteries will have less acid above the plates.

These complicating factors (i.e., a need for increased power and energy with less available space for the battery) have required battery manufacturers to alter the battery internal design configurations to provide the needed power in a lower profile battery container. These internal alterations have typically involved increasing the number of plates used in each cell by employing battery grids with reduced thickness. For example, the number of plates in a BCI Group 24 battery has increased from about 13 to about 19 or so over the last few years while the thickness of the positive grids has decreased from about 65 to 75 mils or so down to about 45 mils and even less in some cases. The reduction in the thickness of the positive grids together with an increase in the number of plates has allowed battery manufacturers to provide Group 24 batteries having rated power output capabilities of 875 cold cranking amps or so. Battery manufacturers currently offer batteries in other BCI sizes having rated power output capabilities of up to 1000 cold cranking amps and even more.

Another aspect that has occurred in recent years is the substantial increase in the under-the-hood temperature to which the battery is exposed in automobile service. Obviously, the under-the-hood temperature is particularly high in the warmer climates. One automobile manufacturer has perceived that, in the past three years or so, the temperature to which an SLI battery is exposed under-the-hood in such warmer climates has risen from about 125° F. to about 165°–190° F. in new automobiles.

The specific temperature increase which is involved is not particularly important. What is important is that such under-the-hood temperatures have in fact increased. The impact of the under-the-hood vehicle service temperature increases on the failure modes has been to substantially increase the occurrence of premature battery failures. The incidence of premature battery failures due to excessive positive grid corrosion has been significant.

One attempt to deal with the acute problem of relatively high under-the-hood temperatures by one battery manufacturer has been to provide a battery designed for such high temperature conditions. This battery goes back to the use of thicker positive grids (about 70 mils or more) while using a smaller number of plates (back down to about 10 per cell). In addition, the head space in each cell is filled with hollow plastic microspheres. The use of such microspheres is perhaps to serve as a vapor barrier to the electrolyte for minimizing evaporative loss of water in the electrolyte or perhaps for limiting heat transfer or the like.

What has not been appreciated in the art is the cumulative effect of all of these complicating factors and increased under-the-hood temperature on the requirements for the battery grid alloy. The overall battery requirements have drastically increased the need for a positive grid alloy that will impart, in the resulting battery, enhanced resistance to positive grid corrosion. As is apparent from the foregoing, a considerable amount of prior work in this field has been directed to calcium-tin-lead alloys for use in maintenance-free battery grids.

Additionally, and more recently, silver-based calcium-tin-lead positive grid alloys have been utilized in sealed, oxygen gas recombinant valve-regulated lead-acid batteries. Such alloys also contain aluminum in an amount of about 0.02 to 0.03% by weight. The calcium content ranges from about 0.09 to about 0.11% by weight while the silver content ranges from about 0.016–0.02% by weight, and the tin content ranges from about 0.5–0.75% by weight.

As previously noted, in addition to forming battery grids by gravity casting, equipment is now commercially available by which battery grids can be continuously cast on a rotary drum grid caster. Additionally, battery grids can also be continuously formed by expanded metal fabrication techniques.

While SLI lead-acid battery manufacturers have available to them this variety of techniques for producing battery grids, some of these techniques have not been successfully commercialized for producing positive grids. The most widely used technique for making SLI battery grids has been the conventional book mold gravity casting technique. It has, however, long been recognized that this technique, semi-continuous at best, can cause several production problems. In the first place, gravity casting techniques are subject to various problems which result in scrap as well as lack of product consistency and the like. These problems include operator errors; wide variation in grid wire thickness and hence overall weight due to mold coating variations and irregularities; substantial material handling in production and difficulty in automating such processes and the accompanying inconsistencies due to human error and the like.

Feeding of these individual grid panels made by gravity casting technique into the pasting machine during high speed production conditions can also result in frequent grid jam ups and with resultant scrap. Further, such jam ups result in production stoppage, lost production, clean-up of jams and variation in paste machine set-up and attendant active material paste weight and thickness variations.

Further, as is known, grids pasted with active material are typically stacked for paste curing prior to assembly of the battery. It is therefore necessary to remove a small quantity of paste surface moisture from the active material paste prior to stacking so that adjacent stacked, pasted plates will not stick together during curing and post-curing, before they are dried. As a practical matter, however, the tendency in commercial production is to surface dry more than is required so as to ensure that any possible sticking problems are eliminated. This further exacerbates the problem of providing product consistency.

Still further, a related problem is the development of what are often termed "checking cracks" or shrinkage cracks in the cured or dried active material paste on the plates, particularly adjacent to the grid wire surface. Such checking cracks can result from either excessive drying or from drying (i.e., moisture removal) too quickly. Such checking cracks not only decrease the expected service life but also the low and high rate discharge performance of batteries using plates having checking cracks because of poor paste adhesion to the underlying grid surface.

Another problem of substantial significance stems from the environmental issues involved in pasting, curing and assembly of batteries using gravity cast SLI battery grids. Lead dust is a major problem, stemming from loss of powdery active material from cured and dry paste during processing and handling while assembling batteries. Mechanical handling loosens powdery active material since there are no surface barriers. The resulting lead dust must be dealt with in an environmentally satisfactory manner, and production staff have to wear respirators while carrying out pasting and battery assembly operations. Indeed, a great many production safeguards need to be provided to handle powdery lead oxide dust.

Potentially, the use of any continuous process like continuous grid casting or other continuous expanded metal fabrication techniques to make battery grids is capable of minimizing, if not eliminating, one or more of the problems associated with gravity casting techniques. There has accordingly been substantial interest and effort directed to the use of such techniques over the years. This effort has resulted in what is believed to be rather widespread use of various continuous, expanded metal fabrication processes for making SLI negative battery grids.

The same benefits would result when using continuous process for making grids and plates for SLI positive battery grids. However, one major issue is present with positive grids and plates that is not an issue with negative battery grids and plates. More particularly, as has been previously discussed herein, corrosion of the positive battery grid is a principal mode of failure of SLI batteries. At least for this reason, as far as can be perceived, expanded metal fabrication techniques have not been widely used commercially for making SLI positive battery grids, because of increased susceptibility of continuous cast strip which is expanded into SLI positive grids to positive grid corrosion. The increasing under-the-hood temperatures discussed herein only serve to exacerbate the difficulties associated with using such expanded metal techniques for producing positive battery grids. Indeed, from the standpoint of customer acceptance, some skepticism has been expressed as to whether continuous expanded metal techniques could be satisfactorily used for commercial production of positive grids and plates.

A principal exception to the foregoing involves a U.S. battery manufacturer who uses a cold-rolled calcium-tin-lead alloy sheet and expanded metal production techniques to make positive and negative battery grids and plates. It is believed that this same general technique has been used for many years. However, what has been occurring at present, it is believed, is that excessive positive grid corrosion is resulting, causing premature battery failure particularly in current automobiles.

In spite of all the considerable work directed to maintenance-free batteries over the past several years, the complicating factors and other aspects previously discussed have created a substantial need for maintenance-free batteries that can meet the power and energy demands required and yet have an adequate service life, particularly when used in warmer climates with elevated under-the-hood vehicle service temperature conditions. The entire automobile service environment and requirements for the battery present an extremely complicated situation which is not all that well understood. A substantial need also exists for a process to continuously produce battery grids that can obviate the problems discussed herein.

The advantages that are provided by sealed lead-acid cells and batteries in comparison to conventional, flooded lead-acid batteries are substantial and varied. Sealed lead-acid battery technology thus offers substantial benefits by eliminating maintenance cell watering), environmental (e.g., expensive waste treatment systems and air-borne acid mist) and safety (e.g., acid burns) concerns. Such cells and batteries offer the possibility of operating with virtually no liberation of hydrogen and oxygen during continuous float charge maintenance charging. Well-designed VRLA cells and batteries with good float charge control and thermal balance during operation could result in a 3 to 10 year service life with very minimal maintenance costs.

It is thus not surprising that sealed lead-acid cells and batteries are widely used in commerce today for various applications. Such sealed lead-acid cells and batteries are often term "VRLA" (i.e., valve-regulated, lead-acid) cells and batteries. In stationary battery applications, the sealed lead-acid batteries provide stand-by power in the event of a power failure. For this type of application, such stationary batteries are maintained at a full state-of-charge and in a ready-to-use condition, typically by float maintenance charging at a constant preset voltage. Stationary batteries are used for stand-by or operational power in a wide variety of applications, including, by way of illustration, telecommunications, utilities, for emergency lighting in commercial buildings, as stand-by power for cable television systems, and in uninterruptible power supplies for computer back-up power and the like. Sealed batteries are also increasingly used in "on the road" and "off the road" electric vehicles like fork lift trucks, automated guided vehicles, and pure electric vehicles, whereby these batteries supply all the energy requirements.

There has been considerable effort in this field over the years to develop grid alloys that possess the many and diverse characteristics needed as a positive grid alloy for use in making the positive plates in sealed lead-acid cells and batteries. Indeed, many of the types of lead-based alloys used in conventional flooded lead-acid batteries have been investigated as candidates for use in sealed lead-acid cells. As one example, lead-based alloys including calcium and tin in varying amounts, sometimes with other alloying components, have been used. However, insofar as it is known, none of these alloys have been able to satisfactorily match, much less exceed, the collective favorable properties of the alloys disclosed in U.S. Pat. No. 4,166,155 to Mao et al. and in U.S. Pat. No. 4,401,730 to Szymborski et al. Particular problems which develop when calcium-tin lead-based alloys are used range from the level of mechanical properties that are considered desirable to preventing premature capacity loss (often termed "PCL"). These VRLA cells and batteries work on the fundamental principal of oxygen recombination at the negative active material during charging. The oxygen recombination reaction maintains the negative plate in a partially discharged state and, as a result, the potential is kept near the equilibrium value for the Pb/PbSO$_4$ system, i.e., $\eta_{neg}$=(80 to 100 mV)$^+$, wherein $\eta_{neg}$ represents the over-voltage of the negative electrode. Since the negative half-cell voltage is polarized by this amount, the positive half-cell electrode will have to operate at a higher voltage which is equal in magnitude to this negative over-voltage shift under a constant or fixed voltage charging. Typically, the cells and batteries used for uninterruptible power systems and telecommunications applications are charged at a fixed constant voltage in the range of 2.27 to 2.35 volts per cell. The consequences of this higher charging voltage on the positive electrode half-cell in continuous float voltage charging in battery service is the higher rate of positive grid corrosion in these VRLA batteries in comparison to flooded lead-acid batteries. Positive grid corrosion rate thus is much higher in the service of a sealed lead-acid battery and could become life-limiting in many instances. The higher rate of positive grid corrosion in VRLA batteries is due to positive half cell voltage shift to higher potentials and also to higher cell temperatures in charging due to the exothermic nature of the oxygen recombination process and lack of an electrolyte reservoir heat sink as is available in flooded lead-acid batteries. Positive grid alloy compositions that have good high temperature corrosion resistance and are free of elemental impurities that could lower either the oxygen or the hydrogen over-voltages would greatly improve the service life of the VRLA batteries in uninterruptible power supply and similar applications.

There accordingly exists a need for a lead-based alloy which can adequately satisfy the diverse requirements needed for a lead-based alloy for making grids for positive plates used in sealed lead-acid cells, particularly for stationary applications, such as the telecommunications field.

It is accordingly an object of the present invention to provide a maintenance-free, lead-acid battery capable of satisfactory service life when operated in relatively high temperature environments.

Another, and more specific, object lies in the provision of an alloy composition useful for making positive grids for such maintenance-free batteries.

A still further and more specific object of this invention is to provide an alloy that can be made into positive grids for such maintenance-free batteries using commercially viable, continuous strip and expanded grid or continuous cast grid manufacturing methods.

Yet another object provides a positive grid alloy for such maintenance-free batteries that will impart enhanced resistance to positive grid corrosion relative to batteries using positive grids made from alloys presently being used.

An additional object of the present invention is to provide an alloy for a positive grid that may be readily formed into a positive grid or a continuous strip followed by grid fabrication using expanded metal techniques or the like without undue loss of any of the key alloying ingredients.

Another object provides a continuous method for making lead-acid battery positive plates characterized by superior high temperature positive grid corrosion resistance.

Yet another object of this invention lies in the provision of lead-acid battery positive plates, and batteries utilizing such plates, characterized by enhanced product consistency relative to the product consistency obtained with gravity cast plates.

A still further object of this invention is to provide a method for making lead-acid battery positive plates that minimizes, or even eliminates, potential environmental concerns such as lead dust and the like.

Yet another object of the present invention is to provide a sealed lead-acid cell or battery utilizing positive grids made of an alloy composition characterized by superior corrosion resistance.

Another object of the present invention is to provide a sealed lead-acid cell or battery utilizing positive grids made of an alloy composition characterized by extended float maintenance charge service in UPS, telecommunications applications, and motive power applications, and where the batteries exhibit very high charge voltage stability due to lack of impurities.

Other objects and advantages of the present invention will become apparent as the following description proceeds, taken in conjunction with the accompanying drawings.

SUMMARY OF THE INVENTION

In general, the present invention is predicated on the discovery that the current positive grid alloys being used for maintenance-free, SLI automotive batteries will not reliably provide an adequate service life when used in the warmer climates. It has been found that a lead-based grid alloy, having an, as added, composition by weight of the total alloy of calcium in the range of from about 0.025–0.06%, tin in the range of from about 0.3 to about 0.7% (up to about 0.9% tin for some applications), and silver in the range of from about 0.015 to about 0.045%, will provide positive grids that will impart to a maintenance-free battery a useful service life in current automobiles operating with elevated under-the-hood temperatures even in geographical regions with relatively high ambient conditions.

When positive grids are made by gravity casting, it has been found that calcium losses occur from the molten alloy in the grid casting operation. Accordingly, one aspect of this invention comprises utilizing, in the alloy composition previously described, the addition of aluminum in an amount to maintain the desired calcium content in the cast positive grid. Adding aluminum to the starting alloy in an amount of from about 0.008 to about 0.0120%, based upon the as-added total weight of the alloy, has been found suitable for this purpose. The concentration of aluminum used in the alloy is a function of molten alloy temperatures used in the casting process. Higher casting process temperatures like 780° F. and higher will require the use of higher aluminum contents like 0.018 to 0.03%. The aluminum content of 0.012% in the starting alloy is used when the molten calcium-tin-silver-aluminum-lead alloy temperatures are in the range of 700°–760° F.

Another aspect of this invention provides a continuous method for making lead-acid battery positive plates involving directly casting an alloy strip from a lead-based, calcium-tin-silver alloy of defined composition, converting the cast strip to a battery grid of the desired configuration using expanded metal fabrication techniques and then pasting the battery grid.

The continuous method of this invention (which involves a continuous production line starting from the cast-strip expansion into expanded grids to expanded strip pasting, to parting of pasted plates, to flash drying to remove surface moisture for pasted plate curing), in one of its more preferred aspects, provides the capability of achieving substantial economic and environmental benefits while providing improved battery performance and enhanced product consistency. The use of suitable absorbent layers of thin tissue-like paper on both sides of the pasted continuous expanded grid mesh strip to shroud the continuously cast, expanded alloy pasted grid mesh strip, when employed with the other aspects of this invention, allows commercial production at rates of up to about 400 positive plates/minute or so while achieving superior product consistency in terms of paste weight control and pasted plate thickness control and reduced (if any) problems due to lead dust and the like in comparison to lead-acid battery positive plates made using gravity casting techniques which is traditionally a batch process.

While the invention is susceptible to various modifications and alternative forms, specific embodiments thereof will hereinafter be described in detail. It should be understood, however, that it is not intended to limit the invention to the particular form disclosed, but, on the contrary, the intention is to cover all modifications, equivalents and alternatives falling within the spirit and scope of the invention as expressed in the appended claims. For example, while the present invention will be described primarily in conjunction with making positive grids and plates for SLI lead-acid batteries of the flooded electrolyte type, it should be appreciated that such grids and plates could be likewise used in sealed oxygen recombinant-valve regulated lead-acid batteries for SLI, UPS, telecommunications, and EV-motive power applications. The problem of positive grid corrosion, in general, is the same in both types of batteries, although it may result from different causes like high temperatures in automobiles and potential continuous overcharge in UPS/ telecommunications usage. Indeed, as may be appreciated, this problem may be even more severe in sealed battery systems due, inter alia, to the oxygen generation and recombination reactions involved which are highly exothermic. Still further, while the use of the present invention is highly advantageous for SLI applications due to the substantial positive grid corrosion problem caused by the relatively high under-the-hood temperatures in automobiles of current design, the present invention may advantageously be utilized in other applications where positive grid corrosion is considered to be a problem.

Accordingly, yet another aspect of the present invention concerns sealed lead-acid cells and batteries having positive grids made using the calcium-tin-silver lead-based alloys described herein. The resulting cells and batteries will be characterized by highly desirable performance characteristics such as stable float-charge voltages throughout long service life (5 to 15 years) due to the absence of impurity transfer into the positive and negative active material, and excellent positive grid corrosion resistance.

DETAILED DESCRIPTION OF THE INVENTION

Figure 1:
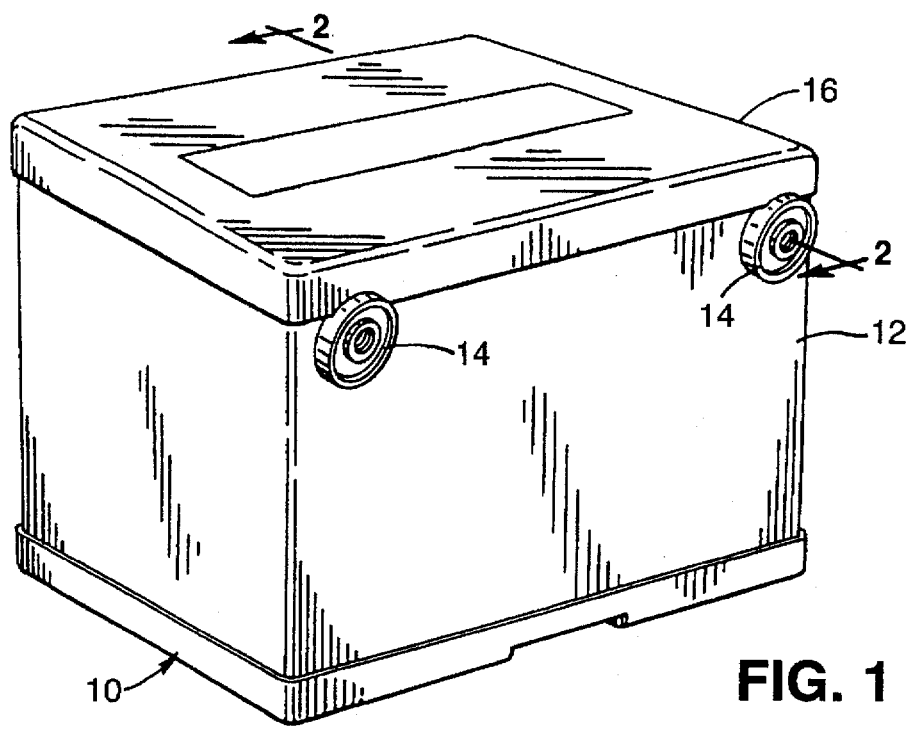
FIG. 1 is a perspective view of a maintenance-free battery of the present invention.

Pursuant to the present invention, the alloys employed in positive grids contain calcium in a range of from about 0.025 to about 0.06%, preferably in the range of 0.025 to 0.05%. More particularly, due to losses during strip casting, the actual calcium content in the resulting cast alloy strip will be somewhat less than the as added composition previously noted, e.g., the calcium content in a cast strip may decrease by about 0.015% or so from the added calcium level. It is preferred to maintain the range of the calcium, as added, from about 0.035 to 0.055%, so that the cast strip and subsequent expanded metal grid mesh alloy contains 0.025 to 0.05% by weight.

One interesting aspect about the alloys of the present invention is that photomicrographs of the cast alloys are considered to indicate no real difference in the microstructures as compared to the microstructures resulting from using high calcium content calcium-tin-lead alloys. It might accordingly be expected that batteries utilizing the alloys of the present invention to form the positive grids would have positive grid corrosion characteristics similar to those of batteries utilizing positive grids formed from the conventional high calcium alloys.

However, that has been found not to be the case. Batteries utilizing the alloys of the present invention to form the positive battery grids exhibit substantially improved positive grid corrosion resistance characteristics. Such improved corrosion characteristics translate to a significantly longer useful battery service life.

The tin content of the alloys of the present invention can range from about 0.3 to about 0.9% or so, preferably from 0.3 to 0.6%, more preferably from 0.4 to 0.7%. In general, the tin content employed will be in the range of 12–18 times that of the calcium content.

The silver content of the alloys of this invention ranges from about 0.015 to 0.045% based upon the total weight of the alloy composition. It is preferred to maintain the silver content in the range of 0.025 to 0.045%, and, more preferably, from 0.03 to 0.040%.

The alloys of the present invention may be produced in the conventional manner by adding the alloying constituents in the prescribed amounts to the molten lead and then mixing until the mass is homogeneous. Commercially used high speed grid manufacturing techniques, which are well known, can then be used. The casting temperatures generally used range from about 750° F. to about 850° F., and the molten alloy is poured into molds maintained at a temperature of about 350° to 450° F.

The alloys of the present invention can be produced by such conventionally used techniques as gravity grid casting machines by using book molds at rates comparable to those used with presently used alloys. Additionally, the alloys of the present invention may be directly cast into a relatively thin cast strip with thicknesses generally ranging from about 0.020 inches to about 0.060 inches and then converted into positive battery grids utilizing commercially available equipment of this type in accordance with one desirable aspect of the present invention, as will be more fully described hereinafter. As may be appreciated, the thickness of the strip selected will be dependent, in general, upon the anticipated grid corrosion life and the service life requirements desired for the particular applications.

Positive battery grids formed using the alloys described herein are characterized by adequate stiffness and age hardening responses so as to provide a grid which has characteristics satisfactory for the subsequent pasting, curing and battery assembly operations which are required.

As previously discussed, the actual calcium content in the resulting cast alloy grid, due to elemental losses from the molten alloy in casting, will be somewhat lower than the as-added amount of calcium, e.g., the calcium content in a cast grid may be about 0.015% or so when the added calcium level was 0.025%. More specifically, it has been found that in grid casting, due to atmospheric oxidation or the like, the calcium content in the cast grid could drop from that of the as-added content anywhere from about 0.005 to 0.015%, and perhaps as much as 0.035% in some instances.

Such low calcium contents in the cast positive grid (e.g., 0.015% or so) may be desirable as regards corrosion resistance. However, stiffness of the cast grids typically is greatly reduced as the calcium content in the cast alloy drops below 0.025%. Also, such low calcium content cast grids can cause problems in mass production battery assembly steps due to lower grid stiffness.

Pursuant to one specific aspect of this invention, aluminum is added to the starting alloy composition in an amount sufficient to maintain the desired calcium content in the gravity cast grid. It has thus been found suitable to add aluminum to the starting alloy composition in an amount of from about 0.008 to about 0.0120%, based upon the as-added total weight of the alloy, alloys cast at temperatures in the range of 700°–760° F. Slightly higher aluminum levels like 0.018 to 0.03% will be required if the molten alloy temperatures in the casting process is in excess of 780° F. It is believed that the aluminum serves as an oxygen scavenger and forms a protective passivating layer on the melt surface, thus preventing calcium oxidation. The small level of aluminum added should not adversely affect to any significant extent the highly desirable corrosion resistance characteristics of positive grids cast from the alloy composition of this invention.

While the use of aluminum has been found suitable to maintain the desired calcium content in the cast positive grid, it should be appreciated that any other oxygen scavenger may be used in place of aluminum for this same function. However, any other oxygen scavenger employed, of course, should not adversely affect to any significant extent the highly desirable corrosion resistance characteristics that are achieved utilizing the present invention.

Figure 2:
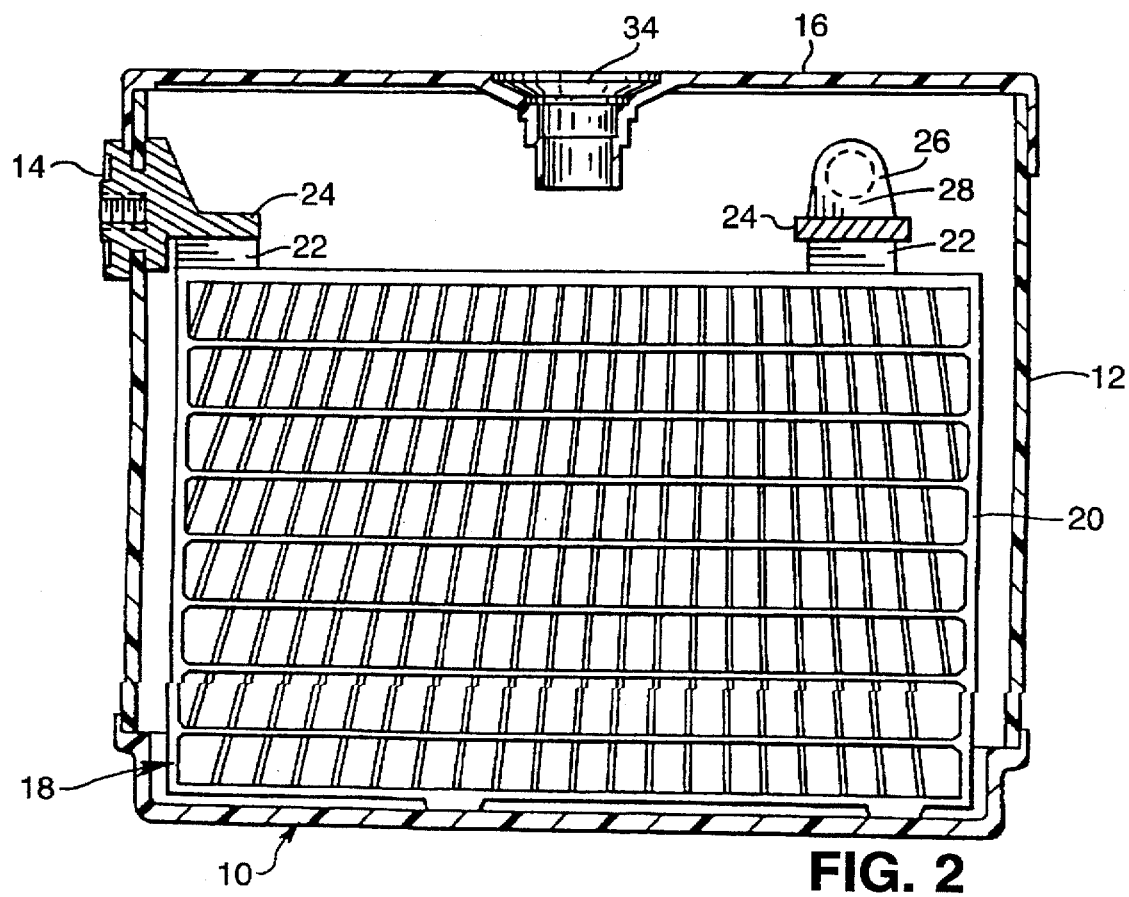
FIG. 2 is a cross-sectional view taken generally along the line 2—2 of FIG. 1 and showing a battery grid made utilizing an alloy composition in accordance with the present invention.

Turning now to the drawings, FIGS. 1 and 2 show a maintenance-free battery utilizing the unique alloy composition of this invention for the positive grids. Thus, a maintenance-free battery 10 is shown which includes a container 12, a pair of side terminal posts 14 and a cover 16 sealed to the container by any conventional means. The container is divided into a plurality of cells, a portion of one cell being shown in FIG. 2; and a battery element is disposed in each of these cells. The battery element comprises a plurality of electrodes and separators, one of the positive grids being shown generally at 18. The negative grids are of identical or similar construction but are formed with any desired antimony-free alloy. The electrode illustrated includes a supporting grid structure 20 having an integral lug 22 and a layer of active material pasted thereto; and a strap 24 joining the lugs 22 of the respective positive and negative grids together.

Intercell connectors are shown generally at 26 and include a "tombstone" 28 which forms a part of the strap 24. The strap 24 may be fused to the grid lugs 22 in assembling the components into an element as is known. The terminals 14 are similarly electrically connected through separate straps 24 to the supporting grid structure 20 during assembly, the base of the terminal forming a part of the strap 24. Suitable manifold venting systems for allowing evolved gases to escape in flooded electrolyte SLI batteries are shown at 34. Many satisfactory venting systems are well known. In addition, it is believed that all the present maintenance-free batteries manufactured in the United States will typically utilize flame retardant explosion-proof vent designs. In sealed lead-acid cell or battery designs, the venting system is designed to operate the cell or battery under pressure in the range of 0.5–10 psig to improve the efficiency of oxygen recombination at the negative electrode and thus prevent the oxygen gas from escaping to the atmosphere. Since the cells and batteries of the sealed oxygen recombinant design operate at higher internal pressures, the polypropylene copolymer container and cover or other polymeric container-cover materials often used should be designed to withstand higher internal pressures. The battery or cell containers usually have thicker walls and the individual cells may be put in steel containers in service applications to prevent outside container walls from bulging and thus affecting internal cell compression and battery performance and life. It is very critical to maintain preset cell compression to achieve optimum electrolyte contact and continuity for ion transport, overall cell performance and for efficient oxygen recombination. Lack of cell compression due to container wall bulging usually results in loss of oxygen, inefficient oxygen recombination, and battery performance which will result in higher water loss of the electrolyte absorbed in glass separators with the consequence of premature battery failure due to low capacity. The cells and batteries are typically designed to maintain a uniform cell compression in the range of 15 to 35% throughout the sealed battery service life.

The particular design configurations of the battery may be varied as desired for the intended application. The alloys described herein, and positive grids made using such alloys, may be advantageously utilized in any type and size of lead-acid automotive battery. For example, the alloys of the present invention and battery grids made therefrom may be advantageously used in dual terminal batteries such as those shown in U.S. Pat. No. 4,645,725. Similarly, while a battery having side terminals has been exemplified, the battery of this invention could comprise a top terminal battery.

The thickness of the positive grids can vary as is desired for a particular service life and a particular desired rated capacity. However, with any given thickness positive grid, the batteries utilizing the alloys of the present invention will impart enhanced positive grid corrosion resistance to the battery in comparison to conventional maintenance-free batteries having positive grids formed from previously used alloys. In general, the grid thickness in the batteries of this invention can desirably vary from about 30 to about 75 mils for most applications. These grid thicknesses should be considered merely exemplary.

As previously noted, the alloys used for the negative grids can be varied as desired. Thus, for maintenance-free battery performance, any negative grid alloy can be used that will provide such performance. This will generally involve an antimony-free, lead-based alloy. Among the typical alloys used for forming negative grids include calcium-tin-lead alloys or calcium-aluminum alloys having the following composition: calcium 0.09 to 0.16%, tin 0.15 to 0.55%, and the balance lead or calcium 0.09 to 0.16%, aluminum 0.01 to 0.035% and the balance, lead.

The alloy for the strap, including the intercell weld connection, can be any strap alloy that will provide the desired characteristics. Many such alloys are known and have been used. The positive and negative grids are connected to the straps using a strap alloy containing, for example, 1.5–6.5% tin in the sealed lead-acid batteries. This lead-tin strap alloy may also have a small selenium content in the range of 0.008–0.03% by weight.

When making a positive grid by expanded metal fabrication techniques, the preferred alloy composition will be altered somewhat. To this end, when expanded metal fabrication techniques are used to form the positive grid, the alloy used, in accordance with this invention, will have the following composition: calcium in the range of from about 0.02 to about 0.05% by weight, tin in the range of from about 0.3 to about 0.6% or 0.9% and silver in the range from about 0.02 to 0.045%. The alloy composition set forth is that of the grid. However, in general, and in contrast to gravity casting techniques, the composition of the grid has not been found to differ in any significant respect from that of the alloy composition used to make the rolled, cast, or wrought strip from which the grid is made. In other words, the composition of the as-added alloy composition does not differ from that of the grid itself. Still, it may be desired to utilize, in the alloy, aluminum in an amount of about 0.005% up to about 0.01% or so by weight of the alloy.

However, while forming a continuous strip by casting or by rolling techniques and then converting such continuous strip into battery grids and plates are well known, it is not believed that such techniques have been employed commercially to a large extent for making positive grids and plates. Thus, positive grid corrosion has long been recognized as being one of the primary modes of SLI lead-acid battery failure; and, as has been discussed herein, the increasing under-the-hood temperatures have served to significantly exacerbate the problem, resulting in premature battery failure due to excessive positive grid corrosion. Indeed, as previously discussed, the principal (if not only) battery manufacturer using positive grids made with expanded metal fabrication techniques, it is believed, does experience undue positive grid corrosion in its batteries in service.

In accordance with one aspect of the present invention, it has been discovered that lead-based alloys of particularly defined composition may be cast into a continuous strip of desired thickness in the range of 0.020 inches to 0.060 inches and then subsequently converted using expanded metal fabrication techniques to positive grids and plates which exhibit high temperature positive grid corrosion characteristics considered to be essentially the same as those achieved with gravity cast positive plates made with grids of the same alloy composition by an appropriate selection of the manner in which the strip itself is made. What is truly surprising is that such improved positive grid corrosion resistance results can be obtained even though photomicrographs of the directly cast strip employed to make the positive plates exhibit the expected orientation of the grain boundaries in the alloy which results from the direct casting process itself. Strong orientation of grains is usually associated with variable corrosion resistance.

Making the results obtained even more surprising is the uniqueness of the directly cast strip in comparison to other cast strips. Thus, there are other cast strips available that are cast and then rolled by various means to provide a strip of the desired thickness. Such strips exhibit the similar type of orientation of the grain boundaries as in directly cast strips. Yet, the performance obtained is vastly different. The performance achieved with direct cast strips is far superior to that achieved with other cast and rolled strips in spite of the strong grain orientation in the directly cast strips which would typically indicate that corrosion resistance would be diminished.

In the continuous strip directly cast to the appropriate thickness and made using an appropriate alloy composition, the resulting strip exhibits microstructural stability without any residual stresses present in the matrix or any recrystallization zones present in the cast matrix. The inherent high temperature corrosion resistance properties of the alloy, it is believed, are sufficient to overcome the enhanced susceptibility to corrosion of the strip due to its oriented grain boundaries resulting from direct casting, allowing positive grids and plates to be made which exhibit outstanding high temperature positive grid corrosion resistance.

In contrast, the continuously cast strip which is cold rolled to the desired thickness exhibits microstructural instability due to residual stresses and recrystallized zones present resulting from the cold rolling or the like. Even using the desired alloy composition does not compensate for the enhanced susceptibility to corrosion from such microstructure instability induced by residual stresses introduced during rolling. Since recrystallization will be non-uniform in the cold rolled strip, corrosion rate differences exist between recrystallized and non-recrystallized (stressed) regions and hence overall corrosion resistance is usually inferior in rolled strip.

Accordingly, the alloys described herein make it commercially feasible, it is believed for the first time, to utilize a continuously cast strip to make the positive plates while achieving high temperature positive grid corrosion resistance characteristics only previously obtained with gravity cast grids. The potential commercial implications are very significant. In addition to the environmental benefits, the economic benefits, it is believed, should amount to at least ten cents per battery, and, when all other beneficial aspects are considered, should be several times that amount.

This level of economic benefit also stands as a tribute to the present invention. Despite these potential benefits and the availability of various techniques for making cast lead alloy strip and converting such strip to battery grids, it remained for this invention to provide a commercially viable, continuous method for making SLI lead-acid battery positive plates having acceptable electrical performance and outstanding high temperature positive grid corrosion characteristics. Indeed, the battery manufacturer having the most at stake has not been able to provide the benefits of the present invention. Thus, this battery manufacturer which has made positive grids from cast and rolled strip and expanded metal fabrication techniques for many years still makes positive grids having high temperature corrosion characteristics vastly inferior to those achieved using the present invention.

The method of the present invention thus involves, initially, providing an alloy strip directly cast to the desired thickness. The thickness of the alloy strip can be varied as is necessary to satisfy the service life and other requirements of the particular application. In general, for present SLI lead-acid battery applications, the strip thickness can vary from about 0.020 inches to about 0.060 inches. In any event, as compared with gravity cast grids, the alloy weight per grid can be significantly less in the method of the present invention while achieving satisfactory performance in service. A significant savings in raw material costs can thus be achieved.

As used herein, the terminology "directly cast" refers to a continuous strip that is cast directly from molten lead alloy into the thickness desired for making the positive grids. The casting process thus does not include any cold rolling or other reduction in the thickness of the strip from the cast thickness to the thickness desired for making the positive grid. Thus, for the reasons described herein, excessive cold rolling of the cast strip will significantly diminish the desired high temperature corrosion resistance characteristics of the resulting grids. However, consistent with appreciation of these characteristics and, while unnecessary, it can be understood that some cold rolling or the like could perhaps be tolerated. Equipment for making a suitable directly cast alloy continuous strip from molten lead alloy is commercially available (Cominco Ltd., Toronto, Canada).

This directly cast strip can then be converted by known expanded metal fabrication techniques to achieve a continuous source of an expanded lead-alloy grid mesh strip suitable for conversion into positive lead-acid battery plates. In general, as is known, these operations involve first expanding into grids and pasting with positive or negative paste and then slitting the moving alloy pasted grid mesh strip to provide, after expansion and other processing, as will be described herein, the desired plate size and lug configurations.

As is known in conjunction with making negative grids, slits are generally made in the longitudinal direction of travel, leaving the transverse edges free from slits. For SLI positive plates, the continuously cast strip may be, for example, from about 3 inches to about 4–5 inches wide, preferably about 4 inches wide. In this fashion, the strip can be slit and expanded at speeds of up to about 60 to 150 feet per minute or so to make transversely positioned, side-by-side grids with the lugs being located toward the center of the expanded strip.

The thus-formed grid mesh is then moved into a pasting zone and pasted with positive active material paste to provide positive plates. Further processing can then be carried out as will be discussed hereinafter in connection with the illustrative, preferred embodiment.

Figure 4:
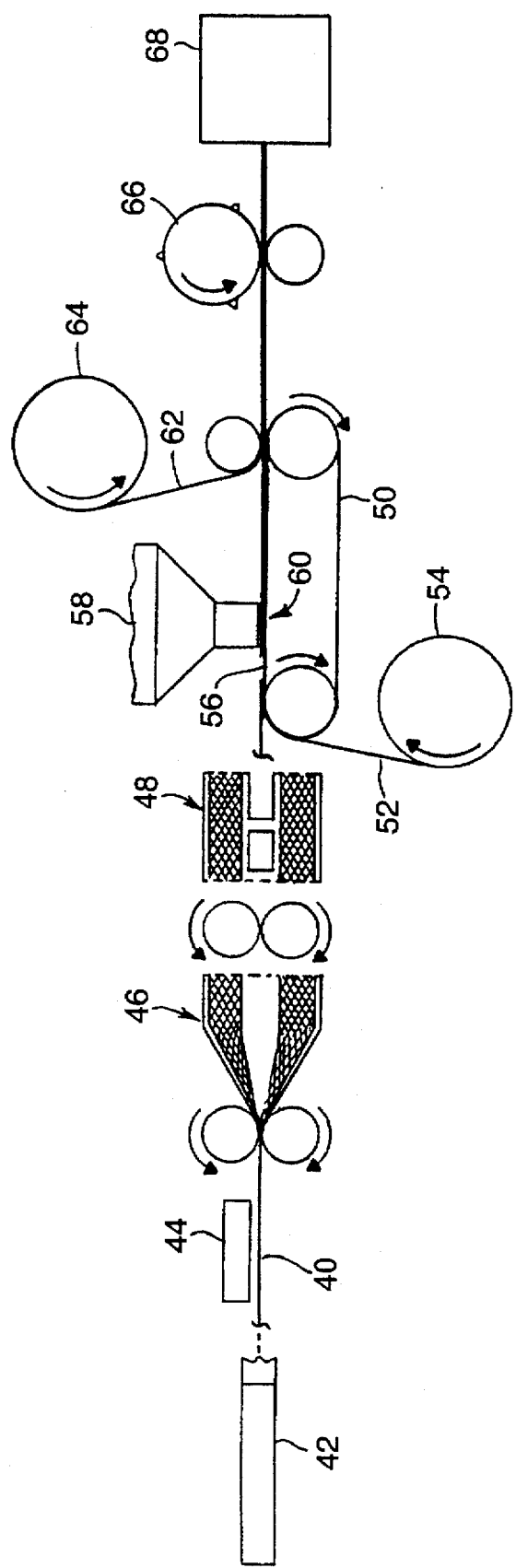
FIG. 4 is a schematic view of a preferred continuous method for making lead-acid positive battery grids and plates.

FIG. 4 thus schematically depicts the various steps and equipment utilized, in the preferred embodiment, of making the positive battery plates of the present invention. The equipment utilized comprises a commercially available continuous expanded battery plate production line (Cominco Ltd., Toronto, Canada). U.S. Pat. No. 4,315,356 to Laurie et al. also illustrates, in general, the method and apparatus for forming the expanded mesh strip. In utilizing this line, the strip is in the form of coils, each coil weighing about 1500 pounds. Strip 40 from a coil 42 stacked in the horizontal position is continuously fed into the grid expander line. Successive coils can be processed without re-threading by using a strip welder 44 which bonds the end of one coil to the beginning of the next coil. Suitable strip welders can achieve the desired bond with cold pressure. As may be appreciated from the foregoing, the grids and plates formed from the strip ends that are bonded together may well have less than optimum high temperature positive grid corrosion resistance. If desired, such grids could be separated out and not used.

In the grid expander section, the strip 40 is converted into a grid mesh of the desired size and pattern. In general, the rotary expansion, shown generally at 46, involves an expander tooling module having an assembly of circular cutters mounted onto three shafts which cut and preform the strip 40 into an expandable pattern. Center and outside guide protrusions are also cut into the strip which allows engagement by three sets of silent chains in the expansion section. The outside silent chains diverge, causing the mesh to expand away from the center, forming a diamond pattern. As the mesh is expanded, the outside edges elongate more than the center. A stretcher pulls the center portion forward to match the outside edge.

Grid mesh flatteners and coining rollers may be employed to roll the grid expanded mesh to the desired thickness (i.e., flattening out any high spots). Edge trimmers may be used to remove the outside edges of the mesh so as to provide dimensional uniformity and eliminating any ragged or protruding portions.

A tab blanker 48 forms the lug and top frame bar configuration of the plate by punching a slug pattern from the center solid strip. The mesh strip is thus guided through a rotary male/female die assembly which cuts the slugs and ejects them as salvage. A center guide protrusion then is flattened as the grid mesh exits the die set.

The thus-formed grid mesh strip is continuously moved onto conveyor belt 50 with bottom absorbent paper layer 52 provided from roll 54 being positioned between strip 40 and the surface of the conveyor belt 56. Positive active material paste from paste hopper 58 is applied to the desired areas of strip 40 in the pasting zone shown generally at 60. Suitable paste-applying apparatus for expanded mesh is known and may be used. As an illustrative example, a suitable paste-applying apparatus is Auto Mac 170 Paster (MAC Engineering, Benton Harbor, Mich.).

After exiting from the pasting zone, a top absorbent layer of paper is positioned on the upper pasted surface of the pasted plates so as to shroud the pasted plates, the pasted plates being thus sandwiched between the top and bottom absorbent layers. In this fashion, any environmental concerns due to lead dust or the like getting into the air should be minimized or generally eliminated because the active material is virtually encapsulated between the paper layers.

Still further, the top absorbent layer of paper functions to simplify any surface drying of the paste required which enhances the consistency of the electrical performance and service life that will be achieved since active material checking and shrinkage cracks next to the grid wires is minimized. Also, when separated into individual plates and stacked, the absorbent paper layer shroud minimizes any sticking problems between adjacent plates in the stack. The paper layer also helps in keeping the plate divider knives clean and sharp.

As regards the absorbent layers, a wide variety of materials can be used. The principal requirements are wet strength, tensile strength, and electrochemical cleanliness. As illustrative examples, it has been found suitable to use 8 pound basis weight battery grade tissue paper from Zellerbach (Cincinnati, Ohio).

As shown in FIG. 4, a top absorbent paper layer 62, unwound from roll 64, is fed onto the upper surface 56 of the pasted strip 40. The resulting pasted plate sandwich can then be further processed as desired.

Typically, such further processing includes, as in the illustrative preferred embodiment, plate parting (or dividing) and flash drying followed by paste curing, as shown in FIG. 4 at 66 and 68, respectively. These steps can be carried out in any desired order. However, it is preferred to first carry out the plate parting step because the paper present on either side of the pasted grid mesh prevents the cutters used for plate parting from removing too much paste; and, also, the active material is soft and less susceptible to cutter damage prior to curing.

Plate parting or dividing employs a rotary cutting die which alternately cuts the pasted grid mesh into left and right plates (viewed from the top). The mesh is suitably guided through this step by using an index ring which engages the center lug cut-outs. The divided individual plates go through a rapidly moving conveyor where pasted plates are heated to remove a small amount of surface moisture. Typically, 15–20% of the total moisture from the plates is removed in this step. The flash-dried plates are stacked in plate trays for further paste curing.

Curing can be carried out by any of the many known techniques. In the preferred practice of this invention, curing of positive pasted plates is carried out by using conditions that favor conversion of tribasic to tetrabasic lead sulfate. Such conditions include temperatures of 175° F. up to 210° F. at relative humidities of 95 to 100%.

Further optional processing steps that could be carried out, if desired, include forced drying of such cured plates at temperatures up to 175° F. and low relative humidity to reduce the free lead content to below 3% and reduce moisture to below 3% level. The negative pasted plates, after flash drying, are usually cured at room ambient temperature for up to 72 hours or can be cured at 110°–148° F. and 95% humidity for 24 to 48 hours.

Figure 5:
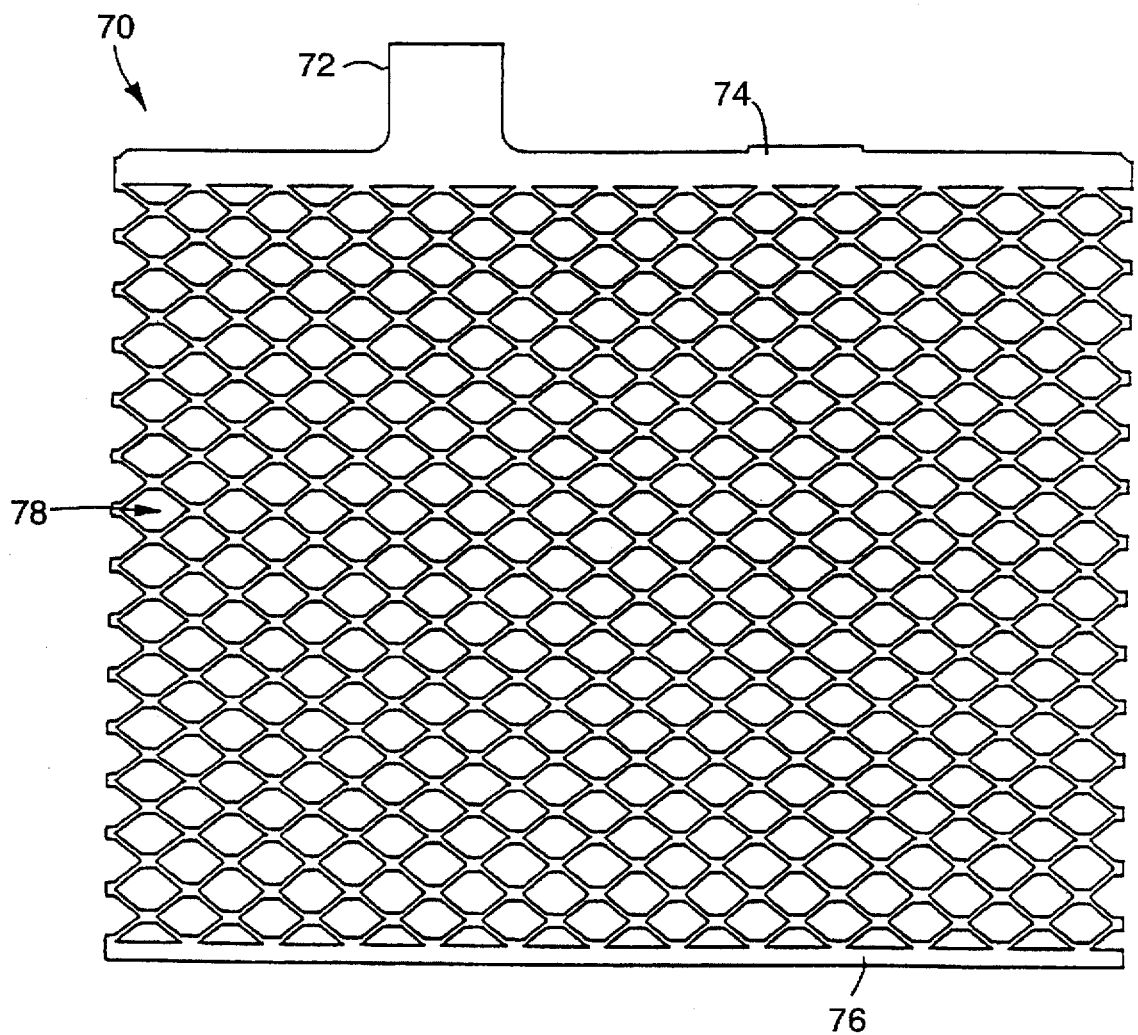
FIG. 5 is a side elevation view of a grid made using the method shown in FIG. 4.

FIG. 5 illustrates a preferred embodiment of a grid made by expanding metal techniques using a directly cast-sheet and made in accordance with the present invention. Grid 70 includes a lug 72, a top bar 74 and a bottom bar 76. The mesh design is generally in the form of diamond shapes as indicated at 78.

As is often employed with positive plates, the positive plates of this invention may be enveloped with any desired separator. Care should be taken in such process since the grids made by the expanded technique and plates do not include side bars, and the exposed mesh sides or edges thus present a potential problem as regards puncturing the separator if appropriate care is not taken in the enveloping process. For this reason, it is preferred that the negative plates be enveloped. Susceptibility to separator puncture and tear and eventual oxidation of separator and separator failure is much greater at the positive side. This can be greatly minimized by enveloping negative plates.

The method of the present invention should be capable of making up to about 400 plates/minute or so while achieving significant improved performance in many respects in comparison to what is achieved using gravity cast grids. The paste weight, density and thickness are thus more readily controlled, as is the paste adhesion during post-curing so as to minimize checking cracks in the paste. This latter aspect enhances the low and high rate discharge performance as well as the expected service life.

These substantial benefits are achieved while the thus-produced batteries also exhibit the outstanding resistance to high temperature positive grid corrosion achieved by using gravity cast grids even though the directly cast strip utilized to make the grids made by the expanded process show a characteristic grain boundary orientation resulting from the continuous strip casting process itself.

This excellent positive grid corrosion resistance possessed by the batteries made with the method of this invention is testimony to the uniqueness, in this respect, of the lead-based calcium-tin-silver alloys described herein. However, while these alloys are preferred, it is believed that this same level of performance could be obtained by substituting, in whole or in part, any other alloying element that would supply the same functions as the alloying elements in the alloys described herein.

Thus, in view of its similar properties and location in the Periodic Table relative to calcium, it should be possible to utilize strontium (Sr) in such alloys while providing functionally equivalent results. If Sr is to be used to make lead-based Sr-Sn-Ag alloys, the amount employed should be between about 0.03–0.065% by weight of the alloy, while the tin, silver, and, when used, aluminum levels remain as hereinbefore described. When both Sr and Ca are used, the amount of each should be adjusted so that the resulting alloy imparts to the resulting battery, whether gravity cast or expanded metal grids are used, the desired high temperature positive grid corrosion resistance and other desired characteristics. In any event, the utility of any potential alloy can be determined in a straightforward fashion by utilizing the 167° F. high temperature J-240 Life Test procedure described herein and comparing the results to those achieved using the lead-based Ca-Sn-Ag alloys described herein.

It is preferred, when only strontium is used, to utilize a level of from about 0.04–0.06%, based upon the weight of the directly cast grid. In this preferred composition, the other alloying ingredients are preferably employed in the following ranges (all based upon the directly cast grid weight): tin-0.4% to 0.9%, silver-0.03% to 0.04%, and aluminum-0.01% to 0.018%.

The use of strontium is not preferred, however, for economic reasons. In addition to its relatively higher cost, the ability to make the alloys is more complicated because strontium is not being used to any extent, if at all, in the battery field as far as can be determined. In contrast, lead-based Ca-Sn alloys are in wide use; and techniques for making alloys of this general type are straightforward and well known.

Further, as may be appreciated, the resulting grids made via gravity or made by expanded grid fabrication techniques using a direct cast sheet, can be heat treated, if desired, to increase the ultimate tensile strength and associated stiffness for facilitating the pasting, stacking and assembly operations. Heat treatment of the alloys of the type described herein is well known, as are numerous suitable techniques. As an example, for illustrative purposes, heat treating, after the strip has been cast and prior to subsequent processing, can be accomplished by heating the cast strip at 200°–220° F. for 150–180 minutes followed by cooling to room temperature.

In accordance with yet another aspect of the present invention, the alloys of this invention are utilized to provide positive grids for sealed lead-acid cells and batteries. As to the alloy composition utilized for the positive grids, the tin-to-calcium contents should be such as to achieve stable precipitates that result in higher mechanical properties and a more corrosion-resistant matrix (e.g., $Sn_3Ca$) while essentially eliminating the presence of positive grid corrosion-enhancing precipitators such as $Pb_3Ca$. Preferably, such benefits are achieved when the tin concentration is at least twelve times that of the calcium content. Further, it is preferable to employ a fabricated positive grid having a silver content which is essentially equal to that of the calcium content and not exceeding 0.05% so that silver intermetallics with Ca, Sn and/or Pb are appropriately distributed throughout the alloy matrix to control and provide the desired mechanical and corrosion resistance properties of the resulting alloy.

In the most preferred alloy composition, the alloy includes Misch metal in an amount sufficient to enhance matrix grain refinement and uniformity of grain structure, and uniformity in the precipitation reaction, thereby further enhancing the mechanical and corrosion resistance properties. Useful contents for the Misch metal will be in the range of from about 0.003 to 0.012% by weight of the alloy. Misch metal typically contains, by weight, about 50% cerium, 15 to 30% lanthanum and the remainder being various rare earth elements. Most preferably, the amount of Misch metal is adjusted so that the fabricated grid will have a cerium content in the range of about 0.002 to 0.010%. The Misch metal additions will be used when the calcium-tin-silver-lead alloy strip is continuously cast for later grid expansion to minimize formation of oriented grains.

The positive grid may be fabricated into the desired grid configuration by any of the many presently available commercial techniques that are known. As may be appreciated, the alloy compositions should be adjusted to provide satisfactory processing with the particular fabricating technique employed.

The particular configuration and the specific components which are utilized with the positive grids of the present invention do not form a part of this invention. Any of a wide variety of configurations and components for VRLA cells and batteries are known and may be used.

Figure 6:
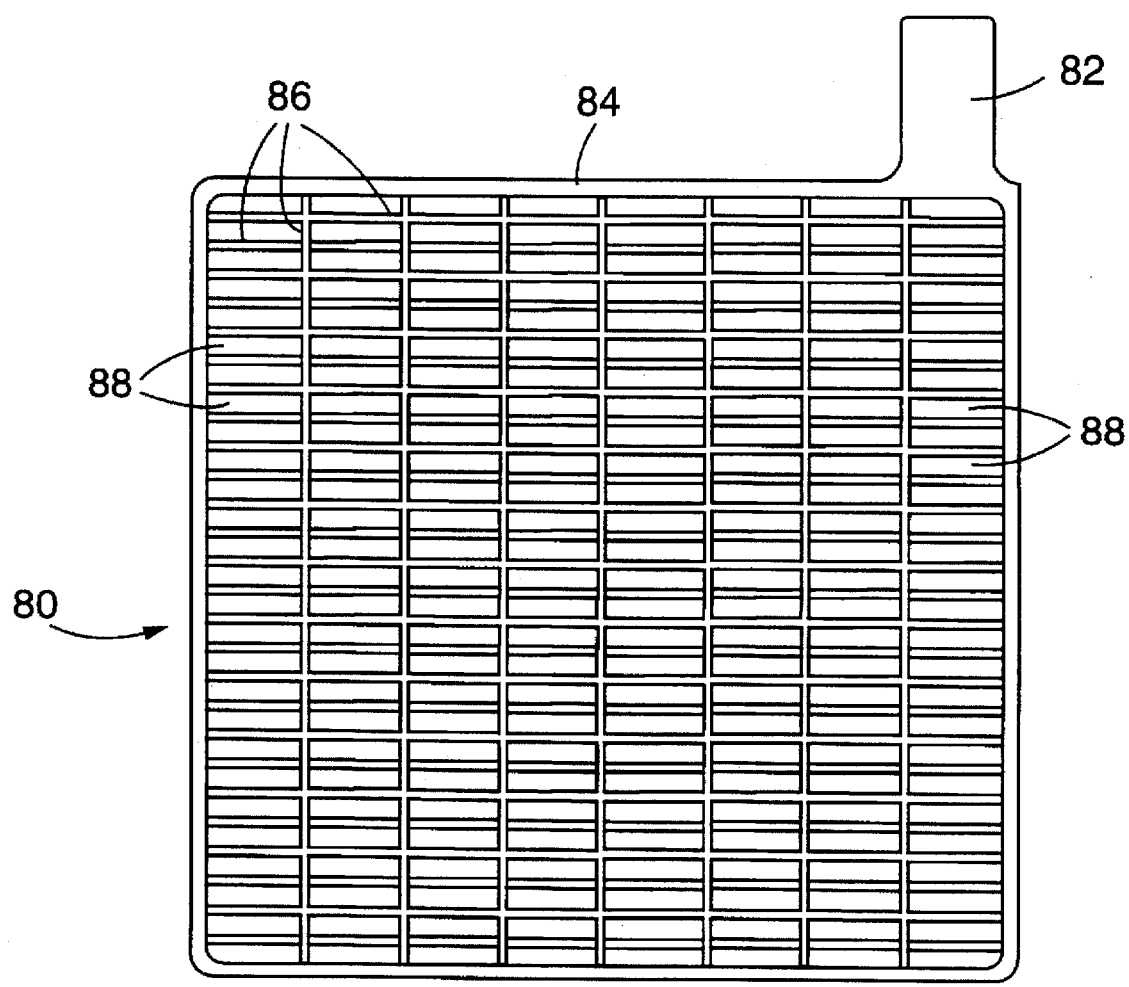
FIG. 6 is a side plan view of a positive plate in accordance with the present invention.

FIG. 6 shows an illustrative example of a positive plate in the form of a grid supporting structure. More specifically, the grid supporting structure 80 includes a lug 82 and a frame 84. The frame 84 defining a boundary for the grid supporting structure 80. The grid includes a plurality of interconnecting supporting members 86 defining a plurality of voids or pockets 88 for accepting active material paste.

The positive plates can be cured and pasted by known techniques. Conventional pastes, such as leady litharge and red lead oxide, may be used in formulating the paste, as may other conventional ingredients. Positive paste density can be in any range suitable for the particular application, as is known.

Figure 7:
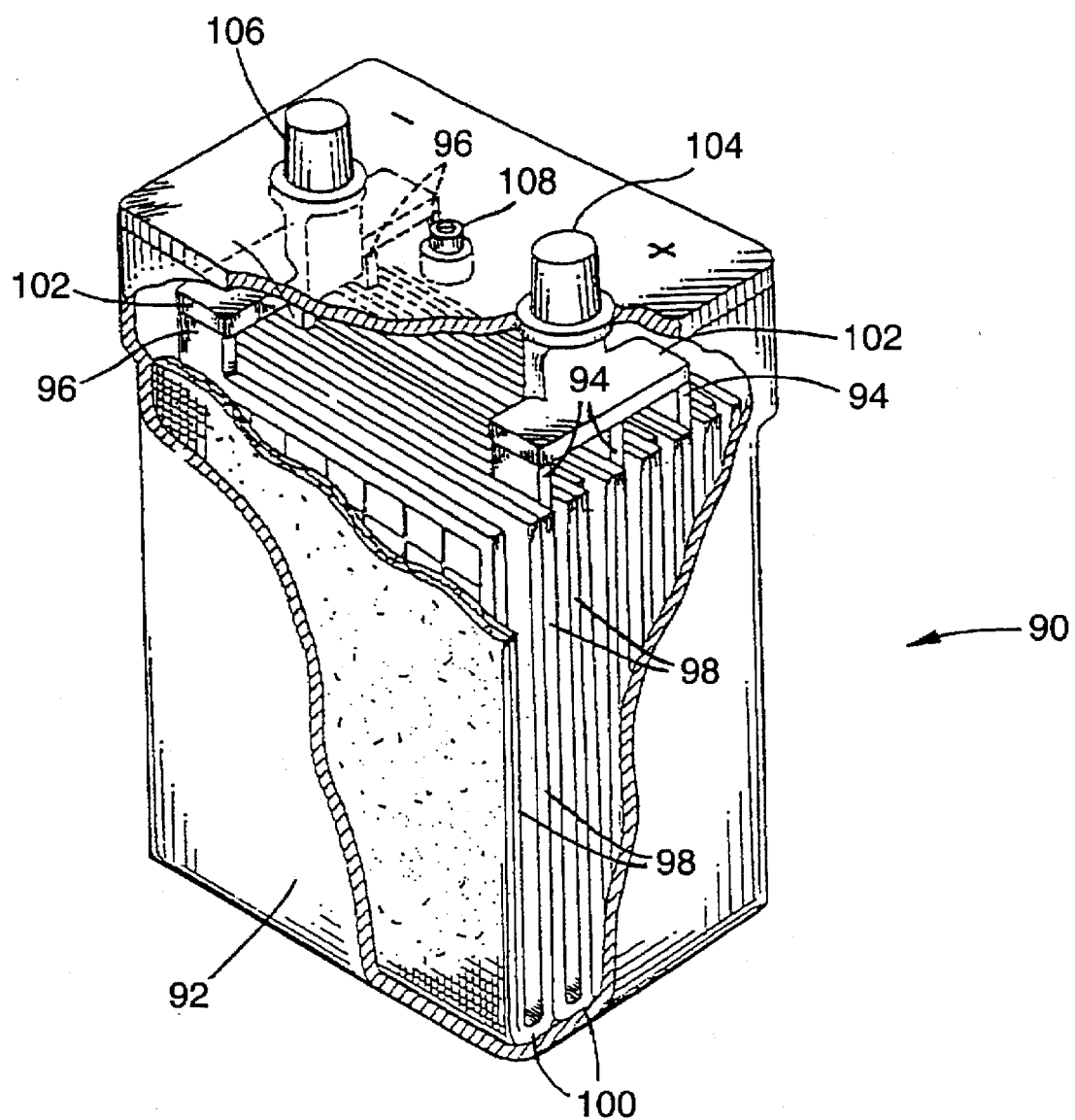
FIG. 7 is a perspective view of a lead-acid cell in accordance with the present invention, partially cut-away to illustrate the internal configuration.

FIG. 7 illustrates a lead-acid cell in accordance with the present invention. The cell 90 has a container 92 containing a plurality of positive and negative plates, 94 and 96, respectively. As illustrated, the cell contains plural positive and negative plates. Of course, the cell can utilize the necessary number of plates to provide the capacity and other electrical performance characteristics desired for the particular application.

The plates 94, 96 are separated by absorbent separators 98. The separators comprise an absorbent material mat. More typically, the separator used for VRLA cells and batteries is a glass mat, although glass mat materials incorporating polyolefin fibers or other polymeric fibers alternatively may be used. Indeed, any separator useful for sealed lead-acid cells may be employed. In the preferred embodiment, the separator extends slightly past the electrode, to prevent an inadvertent short circuit of the cell. In addition, the separator may be folded around and between the plates by employing a U-fold 100, as illustrated in FIG. 7.

The plates 94, 96 preferably fit snugly within the container 92, that is, the electrodes and separators should stay in the assembled condition when the container is inverted. Indeed, as is known, the cell configuration should insure that the plates and separators maintain adequate compression and good contact so as to enhance the electrical performance of the cell. Preferably, as illustrated in FIG. 7, the separators and plates are compressed so as to be in intimate contact with one another. The plates are connected to on another by conductive straps 102 and to external terminals 104, 106 by conventional means.

The thickness of the plates will vary depending upon the application to which the cell is intended. An illustration of a useful range is from about 0.050 inch to about 0.300 inch. It is desired that the service life of the cell should be dictated by the thickness of the positive plates, as opposed to factors such as electrolyte or water loss or other modes of failure. If positive plate corrosion dictates the service life of the cell, the service life may be more readily predicted than for other modes of failure.

Preferably, the container is normally sealed from the atmosphere in use to provide an efficient oxygen recombination cycle as is known. The container should be able to withstand the pressure of the gases released during charging of the cell. Pressures inside the container may reach levels as high as, for example, 0.5–10 psig. Release venting is provided by a low pressure, self-resealing relief valve, such as, for example, a bunsen valve 108. An example of such valve is illustrated in U.S. Pat. No. 4,401,730.

An electrolyte is also included within the container 92. Preferably, the electrolyte is absorbed within the separator and the positive and negative active material. The electrolyte typically is sulfuric acid having a specific gravity in the range of about 1.270 to about 1.340 or even more, as is considered appropriate for a particular application.

A positive plate prepared in accordance with the present invention with alloys will provide long cell life and high cell capacity. The mechanical and casting characteristics of the alloys of the present invention allow grids to be satisfactorily made into the desired size. For example, the current conventional sizes of positive plates are rated as 58 ampere-hours (AH), 98 AH, 108 AH, and 188 AH.

Figure 8:
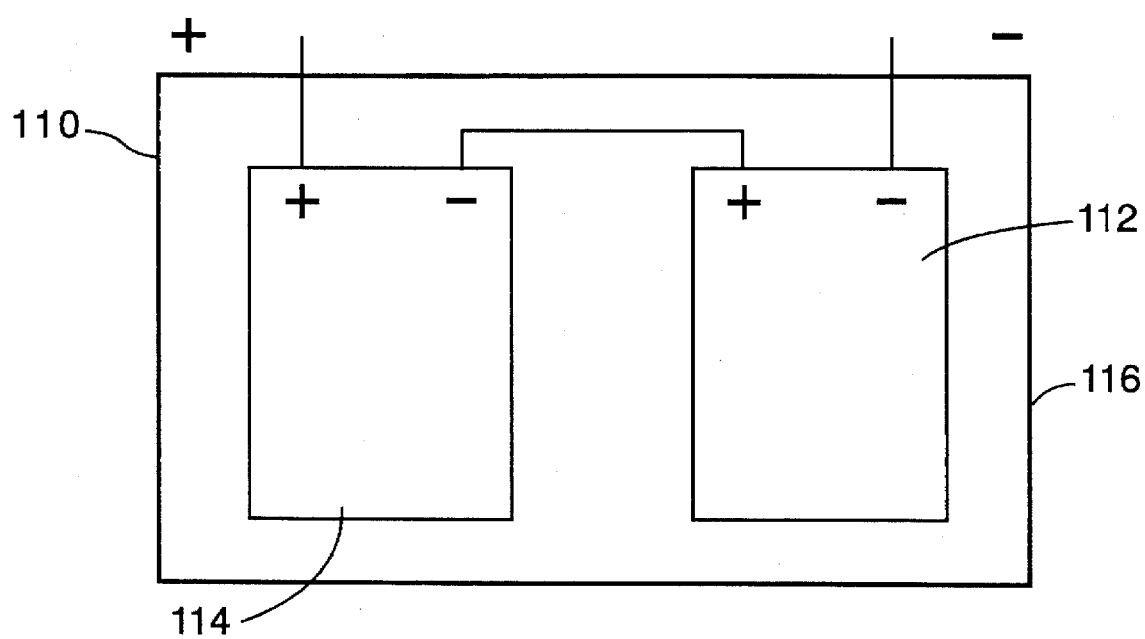
FIG. 8 is a schematic view of a battery in accordance with the present invention.

FIG. 8 illustrates schematically a battery in accordance with the present invention. The battery 110 comprises a plurality of lead-acid cells, 112, 114 as heretofore described (two such cells are illustrated in FIG. 8). The cells are electrically connected to one another in a series. While unnecessary, all of the cells may be contained within a container 116.

The following Examples are illustrative, but not in limitation, of the present invention. Unless otherwise indicated, the percentages set forth are based upon the total weight of the alloy, as added.

EXAMPLE 1

This Example compares the life test performance of batteries made with gravity cast positive grids according to the present invention and compares with batteries having positive grids of high calcium content alloys.

A series of BCI Group 26/70 batteries were built in a dual terminal configuration, as disclosed in U.S. Pat. No. 4,645,725. Batteries with this configuration are commercially available. Two positive grid designs were used, and the details are set forth in Table 1:

TABLE 1

|  | 73J | 56TS |
|---|---|---|
| Positive grid weight - gms | 66 | 50 |
| Positive grid thickness - inches | 0.073 | 0.056 |
| Positive grid dimensions (H × W) in | 3.93 × 5.64 | 4.25 × 5.64 |
| Positive grid area - in$^2$ | 22.1 | 24.0 |
| Horizontal internal wire cross section - in$^2$ | 0.0025 | 0.0017 |
| Vertical internal wire cross section - in$^2$ | 0.0018–0.0022 | 0.0013–0.0016 |
| Horizontal/vertical internal wire corrosion diameter - in | 0.057/0.050 | 0.050/0.040 |

Positive grids were cast from three different alloys using conventional gravity casting methods. The cast grids had the following compositions: Alloy 1 (0.029% calcium, 0.49% tin, 0.032% silver and the remainder lead), Alloy 2 (0.045% calcium, 0.48% tin, 0.031 silver and the remainder lead), and Commercial grid alloy (0.1% calcium, 0.62% tin and the remainder lead).

Batteries using both positive grid designs and the three alloys were built with the same plate count per cell (i.e.—6 positives and 6 negatives). Other than the difference in the positive grid alloy used, all of the batteries built with each of the two grid designs were identical.

The batteries built with the thicker grid design (i.e.—the 73J grid) used the constructional parameters set forth in Table 2:

TABLE 2

| Number of plates per cell | 12 (6 positive, 6 negative) |
|---|---|
| Positive plate enveloped with 0.027 inch thick Daramic separator | |
| Positive grid weight | 66.0 grams |
| Positive paste weight - unformed | 83.1 grams |
| Negative grid weight | 32.5 grams |
| Alloy composition of the expanded metal negative grids | 0.065% calcium, 0.5% tin, balance-lead |
| Negative paste weight - unformed | 67.9 grams |

The batteries built with the thinner grid design (i.e.—the 56TS design) used the constructional parameters set forth in Table 3:

TABLE 3

| | |
|---|---|
| Number of plates per cell | 12 (6 positive, 6 negative) |
| Positive plate enveloped with 0.033 inch thick Daramic separator | |
| Positive grid weight | 49 grams |
| Positive paste weight - unformed | 81.3 grams |
| Negative grid weight | 32.5 grams |
| Alloy composition of the expanded metal negative grids | 0.065% calcium, 0.5% tin, balance lead |
| Negative paste weight - unformed | 67.9 grams |

After completing the usual BCI initial performance testing (i.e.—alternating Reserve Capacity and Cold Cranking Amps), the various batteries built were tested using the industry-accepted SAE J240 life test. The temperatures used were 105° F. (the current temperature specified in the SAE J240 test) and 167° F. The principal failure mode at 167° F.

allow achieving the consistently superior cycle life and field service by which batteries using the alloys of this invention should be characterized. Regardless of the variation in performance in the battery tested, the batteries made using the positive grid alloys of the present invention provided substantially better high temperature performance than the performance provided by the commercially used positive grid alloy.

Indeed, the excellent high temperature performance results using the positive grid alloys of this invention that are shown in the Example are considered to be indicative of the performance results that may be obtained using the alloys of the present invention. For example, Table 5 shows results obtained with BCI Group 34/78 batteries built using a commercial positive grid alloy (i.e.—0.10% calcium, 0.66% tin and the remainder lead) in comparison to batteries built using Alloy 3, an alloy according to the present invention (i.e.—the alloy composition of the cast grid was 0.037% calcium, 0.45% tin, 0.032% silver and the balance lead):

TABLE 5

| | | | | | Current Density | | J240 Life | | | |
|---|---|---|---|---|---|---|---|---|---|---|
| | | Total Plate | Rating | | A/in² At | | 105° F. | | 167° F. | |
| Positive Grid Alloy | Plates Per Cell | Area — in² | RC* | CCA* | 625 Amps | 875 Amps | 625 Amps | 875 Amps | 625 Amps | 875 Amps |
| Commercial alloy[1] | 19TS[2] | 929 | 125 | 875 | 0.67 | 0.94 | 4300+[3] | 2365 | 2795 | 2365 |
| Alloy 3 | 15J[2] | 620 | 110 | 625 | 1.00 | 1.41 | 3440+[3] | 3655 | 5590+[3] | 4400 |

*Reserve Capacity, mins.
**Cold Cranking Amps
[1]The alloy composition of the positive grid was 0.10% calcium, 0.66% tin and the balance lead.
[2]The details of these grid designs are as set forth in Table 1.
[3]"+" indicates that the battery tests were still continuing (viz. — after the cycles indicated, the cycling was continuing since the batteries were still passing the test).

is positive grid corrosion, and testing at this temperature is considered to be a more realistic test of the efficacy of a positive grid alloy as regards corrosion resistance, than is testing at 105° F. in view of the under-the-hood temperature conditions now being experienced in automobiles.

The results of the testing (based upon at least two batteries in each combination) are set forth in Table 4:

TABLE 4

| | 73J Positive Grids | | 56S Positive Grids | |
|---|---|---|---|---|
| Grid Alloy | 105° F. | 167° F. | 105° F. | 167° F. |
| Alloy 1 | 7740–9030 | 3300–4950 | 6600 | 2400–4500 |
| Alloy 2 | 8200–9900 | 3400–4200 | 6500 | 2400–4000 |
| Commercial grid alloy | 9000 | 1500 | 7500 | 1075 |

The variation in high temperature performance using the grid alloys of the present invention is considered to reflect minor problems in the manufacturing of the batteries built for testing (i.e.—start-up problems such as bent plates and the like arising from learning how to handle these grids in comparison to the stiffer conventional grids), rather than reflecting any variation in performance due to the alloys used. Eliminating these minor manufacturing problems will The data in Table 5 supports the view that batteries made with positive grids using the alloy of this invention have such superior performance that similar performance can be obtained even when fewer plates per cell are used and the total plate area is substantially less. Satisfactory performance is obtained even when the battery is discharged at a rate substantially in excess of the rating of the battery (viz.—in Table 5, almost twice the J240 cycle life was provided at 167° F. even when discharged at 875 amps, which was well over the 625 cold cranking amps rating of the battery).

Further, the batteries of this invention, using the unique positive grid alloys, will provide improved performance as the service life of the battery continues, even when the initial performance may be slightly less than that of a conventional battery (due to the use in the conventional battery of more and thinner plates per cell and more total plate area). More particularly, batteries according to the present invention experience substantially less degradation in performance over the useful service life of a battery in comparison to the performance degradation experienced by conventional batteries.

Figure 3:
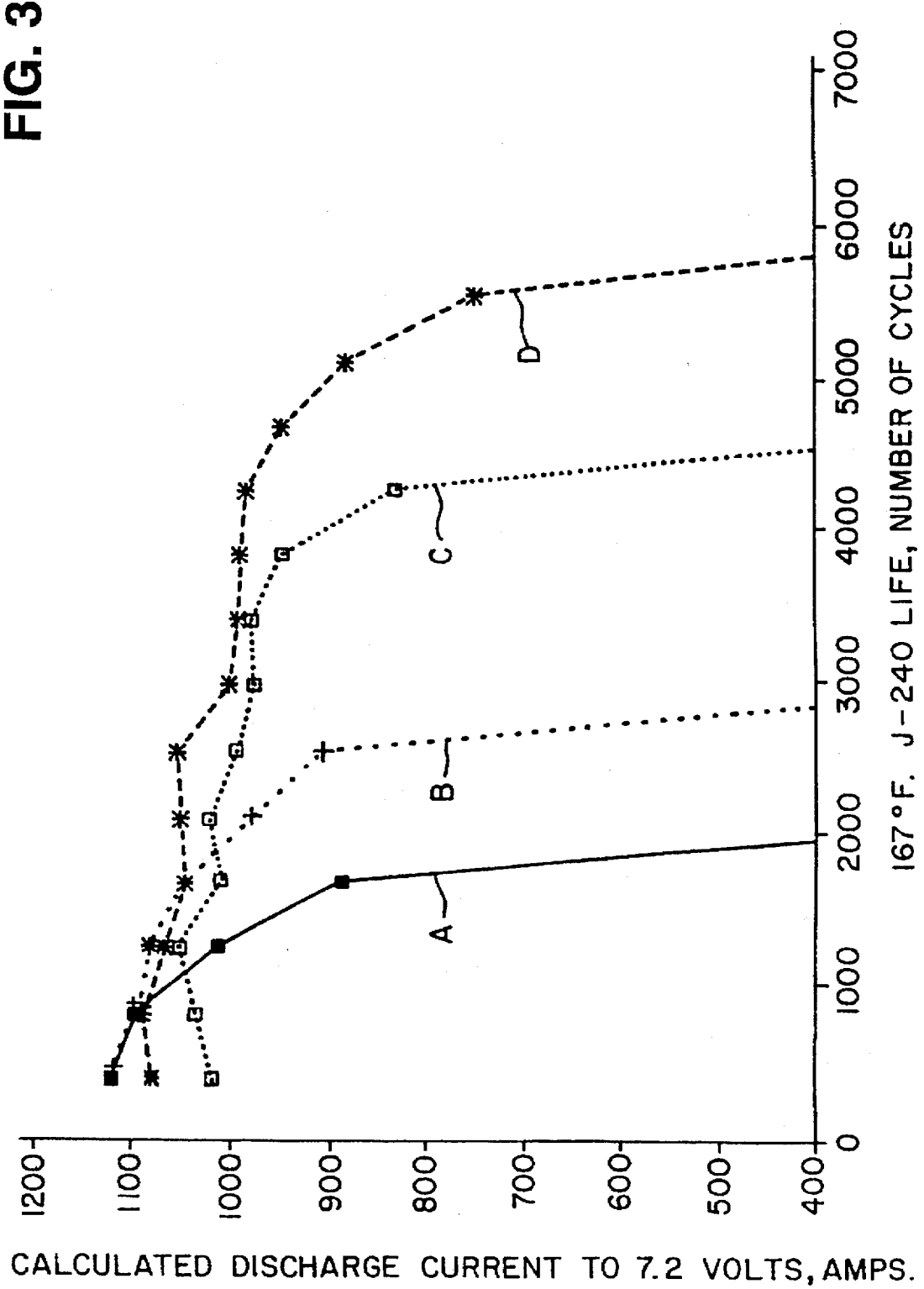
FIG. 3 is a graph comparing the high temperature performance of the batteries of the present invention with that of conventional batteries.

This improved performance over the useful service life can be seen from the data plotted in FIG. 3. Curves A and B show the calculated discharge current in amps to 7.2 amps at 167° F. as the conventional Group 34/78 dual terminal batteries described in conjunction with Table 5 (i.e., using the commercial positive grid alloy) were discharged, respectively, at 875 amps and 625 amps. Curves C and D show the same calculated discharge currents for the Group 34/78 batteries of the present invention also described in conjunction with Table 5, discharged at 875 and 625 amps.

A comparison of curves A and C show that the degradation in the discharge current is much less severe for the batteries of the present invention even when discharged at a current (875 amps) well above the rated CCA capacity (625 amps) for the batteries of the present invention. A comparison of curves B and D shows that the batteries of this invention exhibit substantially shallower degradation than is the case with conventional batteries. This substantial improvement in performance by the batteries of this invention will be even more pronounced at lower temperatures.

EXAMPLE 2

This Example shows the use of the present invention to make positive plates from directly cast strips and expanded A further series of batteries was made in which the positive grids were heat-treated prior to being pasted. The heat treating involved heating the cast strip at 205° F. for 160 minutes and then cooling to ambient temperature. This heat-treated cast strip was then run through the Cominco rotary grid expander machine to make a "J" plate and pasted with positive paste. The flash-dried positive plates were cured in a steam chamber at 200° F. for 120 minutes and post cured at ambient temperatures for 3 days before the batteries were assembled. The mean grid weight for the positive grids was 40 grams and 33 grams for the negative grids and the unformed active material paste density of the positive plates was 3.92–4.05 g/cc. Table 7 sets forth the results of the electrical performance of these batteries.

TABLE 7

| Positive Grid | $RC^1$ | $RC^2$ | $RC^3$ | 625 A-0° F. | | | | 625 A-0° F. | | | |
|---|---|---|---|---|---|---|---|---|---|---|---|
| | | | | 5" V | 30" V | 6 Vt | CCA* | 5" V | 30" V | 6 Vt | CCA* |
| 0.029" Strip Modified Cutters | 81.1 | 115.8 | 119.8 | 7.95 | 7.33 | 55.6 | 639 | 8.05 | 7.47 | 62.5 | 658 |
| 0.029" Strip Unmodified Side | 75.1 | 115.4 | 119.3 | 8.00 | 7.39 | 56.3 | 646 | 8.15 | 7.62 | 65.0 | 678 |

*Calculated cold cranking amps.

grid mesh metal techniques and the resulting performance in SLI lead-acid batteries.

A line similar to that shown in FIG. 4 was used to make positive plates. The alloy composition used for the positive plates was as follows: 0.028–0.036% Ca, 0.52% Sn, 0.036% Ag-Pb. Negative grids were used having the following composition: 0.065–0.08% Ca, 0.5% Sn-Pb.

A series of Group 34/78 batteries were made using 14-J type plates per cell. Two groups of batteries were made, one with a 0.029 inch strip and the other with a 0.038 inch strip. In each group, a subset was made in which a minor apparatus change was made (not considered as effecting the electrical performance). The electrical performance of the batteries was tested and compared to that of similar batteries (except using positive plates gravity cast from an alloy composition of 0.04% Ca, 0.53% Sn, 0.033 Ag). Table 6 sets forth the results.

It has also been found that positive grid corrosion characteristics are influenced by open circuit wet storage at ambient temperature conditions. The rate of positive grid corrosion is about three times faster under open circuit voltage storage conditions than under regulated voltage controlled charging. Also, under typical automobile use, the battery is on open circuit up to about 90% of the time.

Accordingly, the positive grid corrosion characteristics of the batteries under open circuit storage conditions has a significant impact upon the overall service life performance of a battery. The batteries of the present invention exhibit excellent resistance to positive grid corrosion in comparison to that of conventional batteries under open circuit conditions.

Thus, the batteries of the present invention exhibit excellent resistance to positive grid corrosion in comparison to that of conventional batteries under all important conditions where positive grid corrosion is often the prime failure mode. This excellent resistance to positive grid corrosion equates to better service performance of the batteries of this

TABLE 6

| Type Of Positive Grip | Battery wt/lbs[1] | Grid wt/gms | Paste wt/gms | $AMAD^2$ | RES $RC^1$ | $RC^2$ | $RC^3$ | $RC^4$ | C20 |
|---|---|---|---|---|---|---|---|---|---|
| Standard Gravity Cast | 40.30 | 65 | 82 | 4.10 | 117.2 | 116.8 | 113.3 | 108.3 | 61.2 |
| 0.029" Strip Modified Cutters | 38.21 | 38 | 86 | 4.00 | 114.2 | 121.9 | 121.0 | 122.6 | 69.8 |
| 0.029" Strip Unmodified Side | 38.38 | 38 | 88 | 4.00 | 122.8 | 128.7 | 128.3 | 128.9 | 72.5 |
| 0.034" Strip Modified Cutters | 38.22 | 43 | 86 | 4.18 | 113.0 | 118.8 | 117.5 | 119.4 | 69.6 |
| 0.034" Strip Unmodified Side | 38.44 | 43 | 81 | 4.18 | 117.9 | 122.0 | 119.9 | 120.6 | 70.4 |

| Type Of Positive Grip | 625 A-0 F. | | | | 650-0 F. (calculated) | | | | 900 A 80 F. | | | 125° GASSING | |
|---|---|---|---|---|---|---|---|---|---|---|---|---|---|
| | 5" V | 30" V | 6 Vt | CCA | 5" V | 30" V | 6 Vt | $CCA^4$ | 5" V | 30" V | $CCA^4$ | ma | cc/min |
| Standard Gravity Cast | 8.35 | 7.75 | 55.8 | 695 | 8.30 | 7.67 | 49.8 | 708 | 8.70 | 7.89 | 1010 | 146 | 0.95 |
| 0.029" Strip Modified Cutters | 8.17 | 7.54 | 59.6 | 666 | 8.04 | 7.40 | 55.4 | 675 | 8.17 | 7.23 | 905 | 144 | 0.94 |
| 0.029" Strip Unmodified Side | 8.22 | 7.46 | 52.6 | 655 | 8.17 | 7.44 | 52.9 | 677 | 8.33 | 7.41 | 932 | 149 | 1.00 |
| 0.034" Strip Modified Cutters | 8.22 | 7.56 | 56.0 | 667 | 8.10 | 7.43 | 53.8 | 677 | 8.26 | 7.33 | 920 | 156 | 1.20 |
| 0.034" Strip Unmodified Side | 8.34 | 7.67 | 57.5 | 682 | 8.20 | 7.52 | 54.2 | 689 | 8.40 | 7.48 | 943 | 149 | 1.07 |

[1]Weight (and all other values) is the mean of 4 or 5 batteries.
[2]Unformed positive active material density, gms./cc.
[3]"Res." means residual; "RC" is reserve capacity in minutes.
[4]Calculated cold cranking amps.

invention as the service life of the battery continues due to the greater degradation experienced by conventional batteries.

Moreover, this improved performance of the batteries of this invention allows the battery manufacturer a wide range of design choices, allowing the design of excellent cost-efficient batteries for a particular application. As one dramatic example, the battery of this invention described in conjunction with Table 5 utilizes about two pounds of lead less than the conventional batteries described in relation to Table 5. A superior performing battery is provided, and the reduced material costs translate to savings substantially larger than the profit margin often available to battery manufacturers.

Still further, the continuous method for making positive plates using a directly cast strip and expanded grids made using the Cominco rotary grid expander which forms one part of this invention offers enormous potential economic benefits. As well, certain performance enhancements are achieved as has been previously discussed, while not resulting in any performance degradation in any other respects that is meaningful (e.g., the use of continuously cast alloy strip and grids made by expanded metal techniques may result in a perceptible, but slight, decrease in the cold cranking amps obtained relative to that obtained with gravity cast grids; however, the slight decrease is not considered meaningful).

We claim:

1. A sealed, lead-acid cell comprising a container normally sealed from the atmosphere in service, at least one positive plate and a negative plate disposed within said container, a separator disposed within said container and separating said positive and negative plates, and an electrolyte substantially completely absorbed in said separator and said plates, said positive plate comprising a grid supporting structure having a layer of active material pasted thereto, said grid supporting structure comprising a lead-based alloy consisting essentially of lead, from about 0.025% to about 0.06% calcium, from about 0.3% to about 0.9% tin, and from about 0.025% to about 0.045% silver, the percentages being based upon the total weight of said lead-based alloy.

2. The cell of claim 1, wherein the calcium content of said lead-based alloy is in the range of about 0.025% to about 0.05%.

3. The cell of claim 1, wherein the tin content of said lead-based alloy is in the range of about 0.4% to about 0.6%.

4. The cell of claim 1, wherein the silver content of said lead-based alloy is in the range of about 0.025% to about 0.045%.

* * * * *